(No Model.)   15 Sheets—Sheet 1.

T. W. CAPEN.
TRAVELING CRANE.

No. 270,386.   Patented Jan. 9, 1883.

Fig. I.

WITNESSES   INVENTOR
   Thomas W. Capen
   By his Attorneys (No Model.)

15 Sheets—Sheet 4.

T. W. CAPEN.
TRAVELING CRANE.

No. 270,386. Patented Jan. 9, 1883.

WITNESSES
Wm A. Skinkle
Edwin A. Newman

INVENTOR
Thomas W. Capen.
By his Attorneys
Baldwin, Hopkins & Peyton (No Model.)  
15 Sheets—Sheet 5.

T. W. CAPEN.
TRAVELING CRANE.

No. 270,386. Patented Jan. 9, 1883.

WITNESSES  
Wm. A. Skinkle  
Edwin A. Newman

INVENTOR  
Thomas W. Capen.  
By his Attorneys  
Baldwin, Hopkins & Payton (No Model.) 15 Sheets—Sheet 6.

T. W. CAPEN.
TRAVELING CRANE.

No. 270,386. Patented Jan. 9, 1883.

WITNESSES
Wm A. Skinkle
Edwin A. Newman

Figure 9:
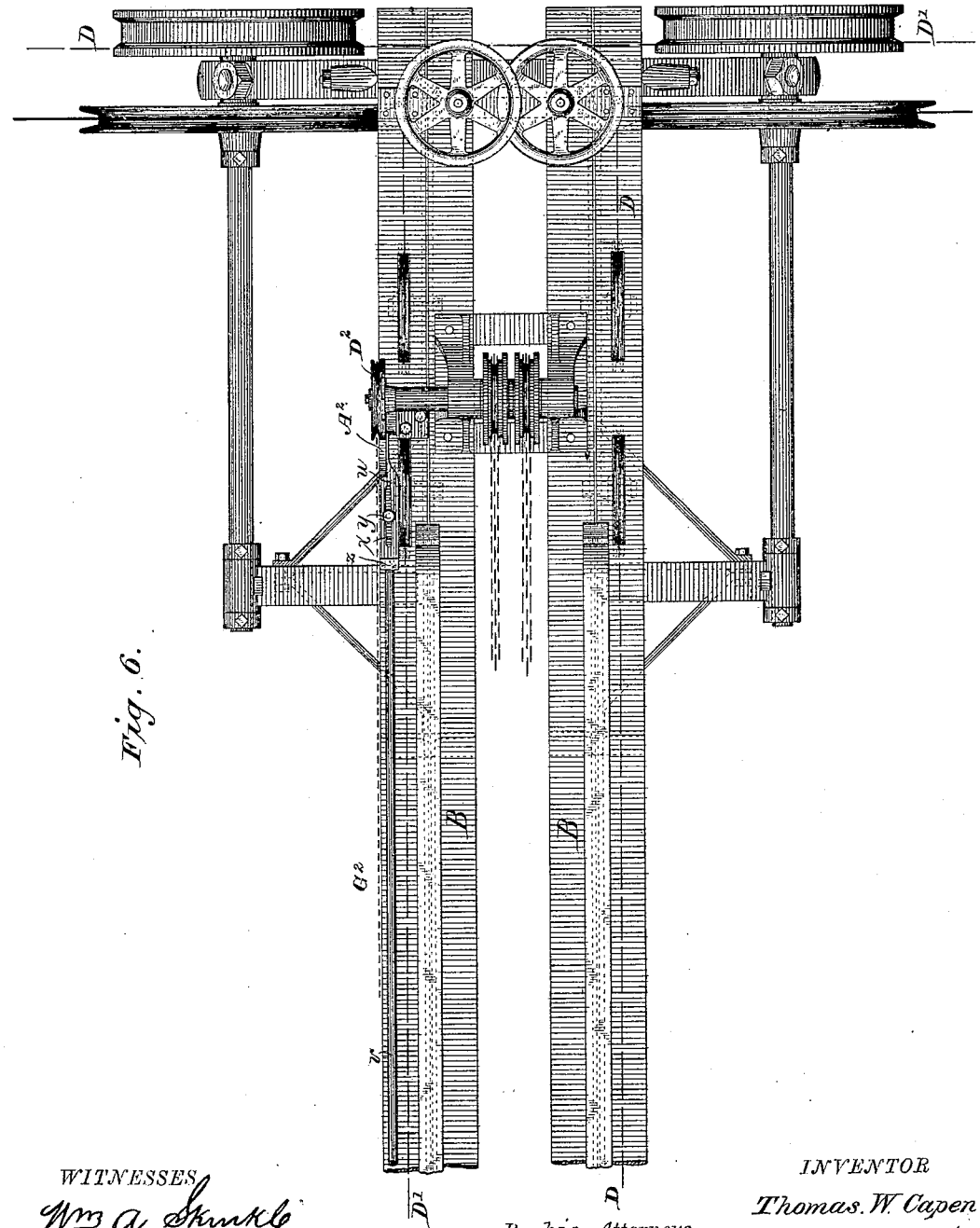

INVENTOR
Thomas. W. Capen
By his Attorneys
Baldwin, Hopkins & Payton (No Model.) 15 Sheets—Sheet 7.
T. W. CAPEN.
TRAVELING CRANE.
No. 270,386. Patented Jan. 9, 1883.
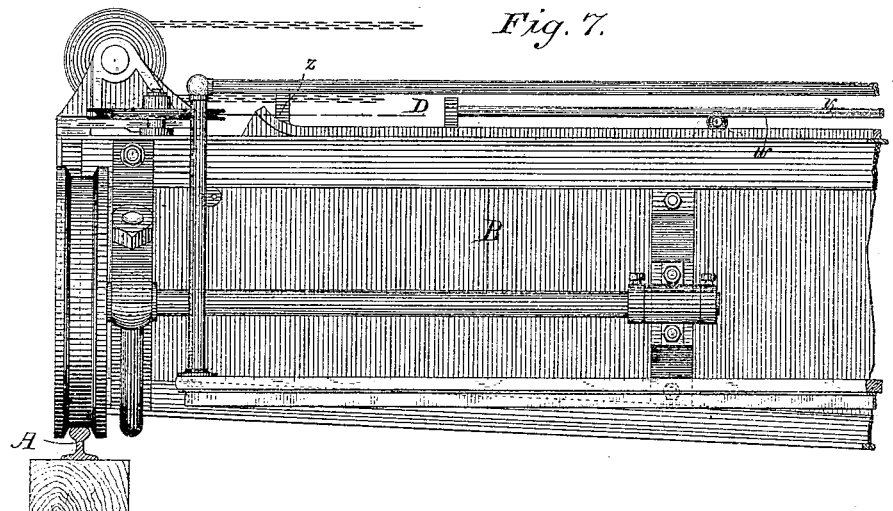
Fig. 7.
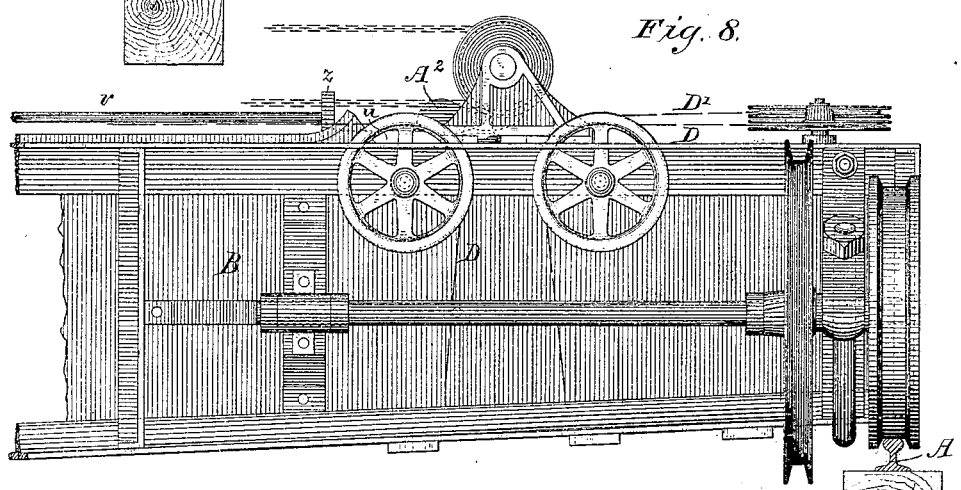
Fig. 8.
Fig. 9. Fig. 10.
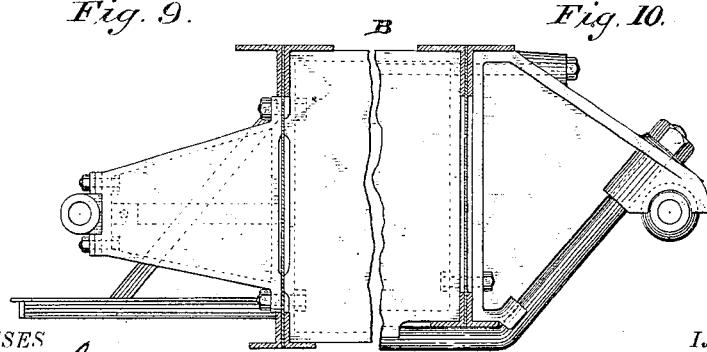
WITNESSES
Wm A. Skinkle
Edwin A. Newman
INVENTOR
Thomas W. Capen,
By his Attorneys
Baldwin Hopkins & Peyton

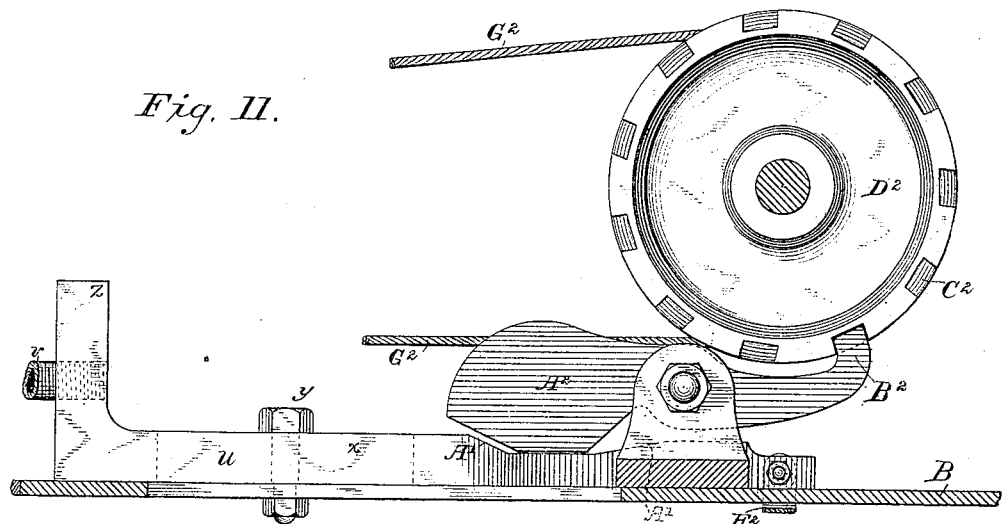

(No Model.) 15 Sheets—Sheet 9.
T. W. CAPEN.
TRAVELING CRANE.

No. 270,386. Patented Jan. 9, 1883.

WITNESSES
Wm A. Skinkle
Edwin A. Newman

INVENTOR
Thomas W. Capen
By his Attorneys
Baldwin, Hopkins & Peyton (No Model.) 15 Sheets—Sheet 10.
T. W. CAPEN.
TRAVELING CRANE.

No. 270,386. Patented Jan. 9, 1883.

Fig. IV.

WITNESSES
INVENTOR
Thomas W. Capen,
By his Attorneys (No Model.) 15 Sheets—Sheet 11.

T. W. CAPEN.
TRAVELING CRANE.

No. 270,386. Patented Jan. 9, 1883.

WITNESSES
Wm A. Steinle
Edwin A. Neuman

INVENTOR
Thomas W. Capen
By his Attorneys
Baldwin, Hopkins & Peyton (No Model.) T. W. CAPEN. 15 Sheets—Sheet 12.
TRAVELING CRANE.

No. 270,386. Patented Jan. 9, 1883.

WITNESSES  
INVENTOR  
Thomas W. Capen.  
By his Attorneys  
Baldwin, Hopkins & Peyton (No Model.) 15 Sheets—Sheet 13.

T. W. CAPEN.
TRAVELING CRANE.

No. 270,386. Patented Jan. 9, 1883.

WITNESSES
Wm A. Skinkle,
Edwin A. Newman,

INVENTOR
Thomas W. Capen
By his Attorneys
Baldwin, Hopkins & Peyton (No Model.)  T. W. CAPEN.  15 Sheets—Sheet 14.

TRAVELING CRANE.

No. 270,386.  Patented Jan. 9, 1883.

WITNESSES  
INVENTOR  
Thomas W. Capen.  
By his Attorneys

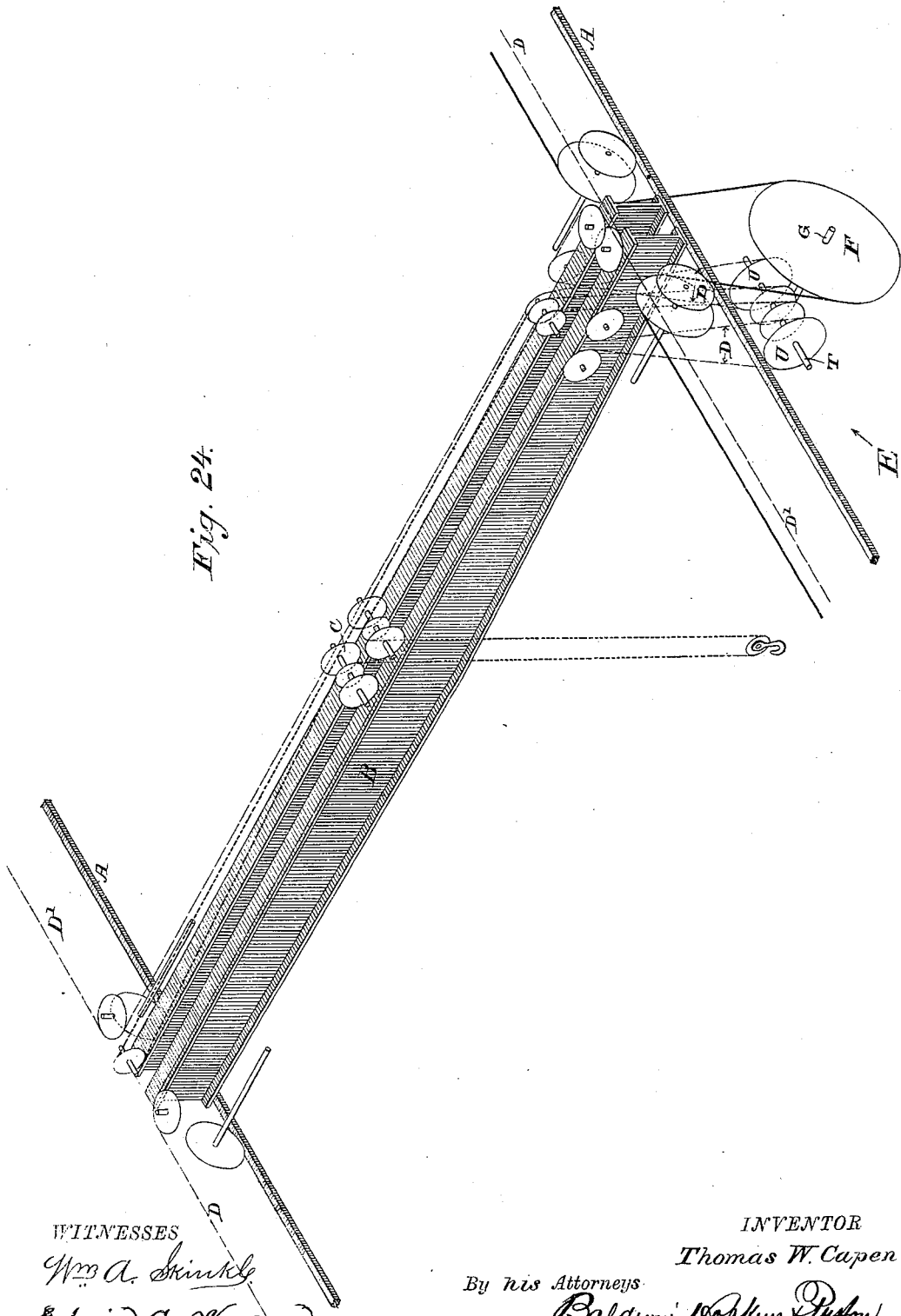

UNITED STATES PATENT OFFICE.

THOMAS W. CAPEN, OF STAMFORD, CONNECTICUT, ASSIGNOR TO THE YALE LOCK MANUFACTURING COMPANY, OF SAME PLACE.

TRAVELING CRANE.

SPECIFICATION forming part of Letters Patent No. 270,386, dated January 9, 1883.

Application filed November 4, 1882. (No model.)

*To all whom it may concern:*

Be it known that I, THOMAS W. CAPEN, of Stamford, in the county of Fairfield and State of Connecticut, have invented certain new and useful Improvements in Traveling Cranes, of which the following is a specification, reference being had to the accompanying drawings.

My invention relates to improvements applicable to traveling cranes of the kind patented in the United States to Thomas A. Weston, December 25, 1877, No. 198,718, in which are two fixed cables, each extending from one end of one track to the opposite end of the other track, crossing the space between the tracks upon the bridge which carries the crab mechanism and trolley, and together serving to impart the horizontal movements to the bridge, all of which is set forth in detail in the said patent. In connection with such a traveling crane my "reversing mechanism," (shown in my United States Patent No. 237,675, granted February 15, 1881,) is well adapted for use, and some of my present improvements relate to or are additional to that reversing mechanism.

In the accompanying drawings so much of both the above-mentioned patented devices is illustrated, together with my present improvements, as is necessary to fully set forth the relations and utility of the latter when applied to a traveling crane of the species above mentioned, or in a similarly appropriate situation; but as these patented devices are now in general use and well understood by those skilled in the art of making and using traveling cranes, I need not set them forth here further than to refer to the said patents.

For convenient and orderly description of my present improvements, they may be further classified as relating to, first, the operating mechanism within the crab for effecting travel; second, the placing of the crab mechanism under the bridge; third, an automatic safety-stop to prevent the bridge from running too far on the tracks; fourth, a brake applied to the worm-shaft to keep the load from running down; fifth, an automatic stop to prevent the trolley from running too far on the bridge; and, sixth, locking-gear to hold the trolley still while the load is being lifted or lowered.

Figure 1:
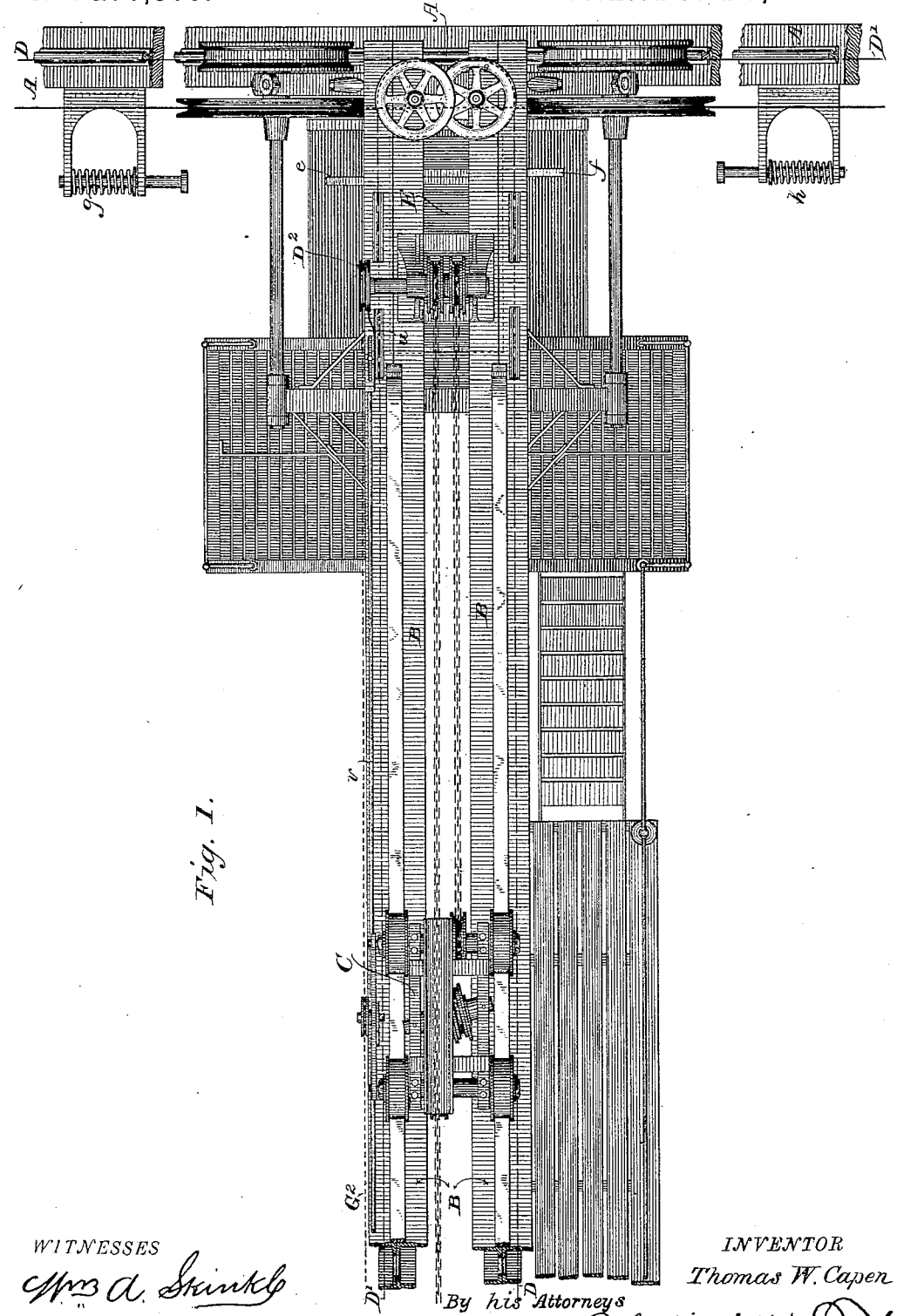
Figure 2:
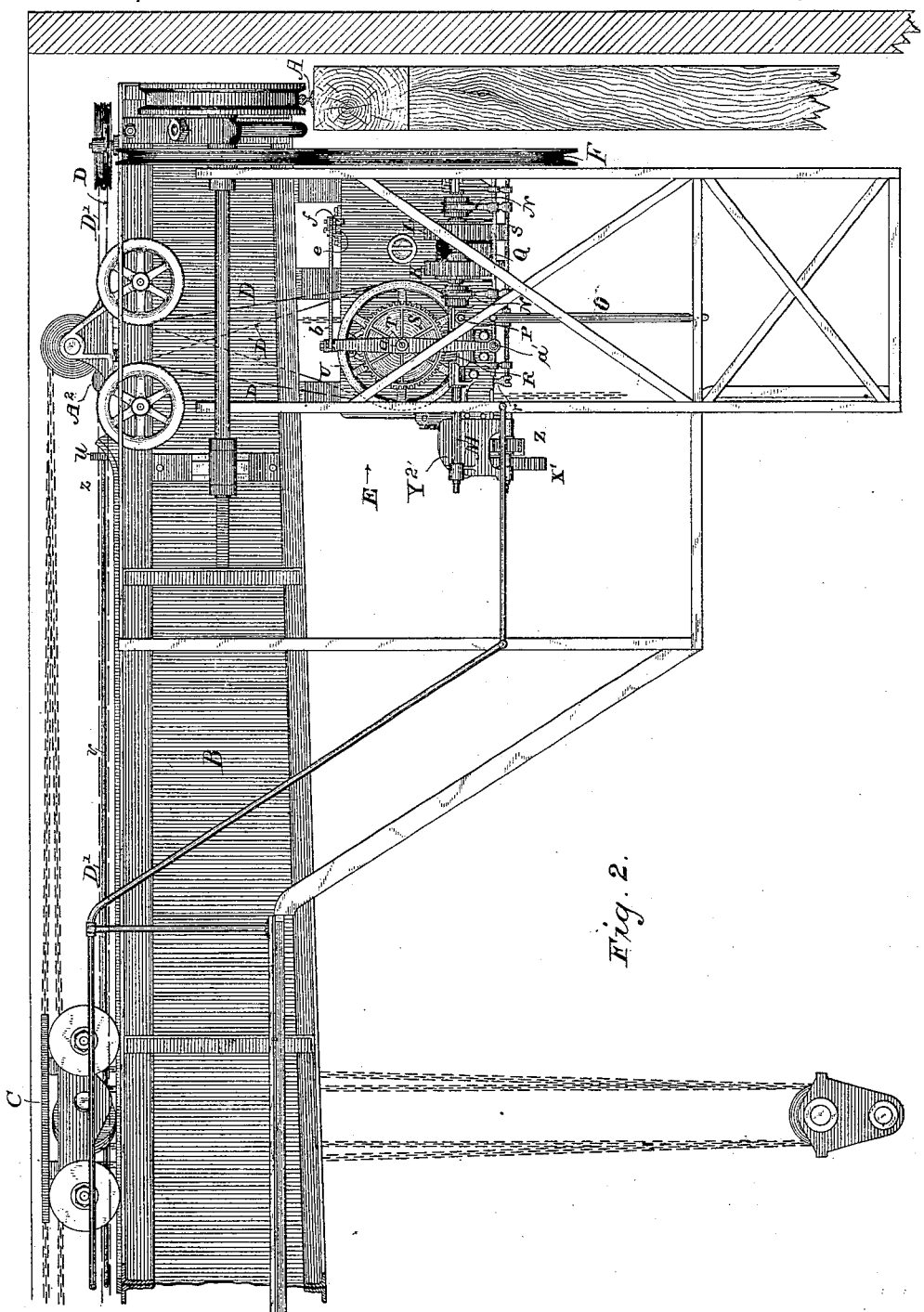
Figure 3:
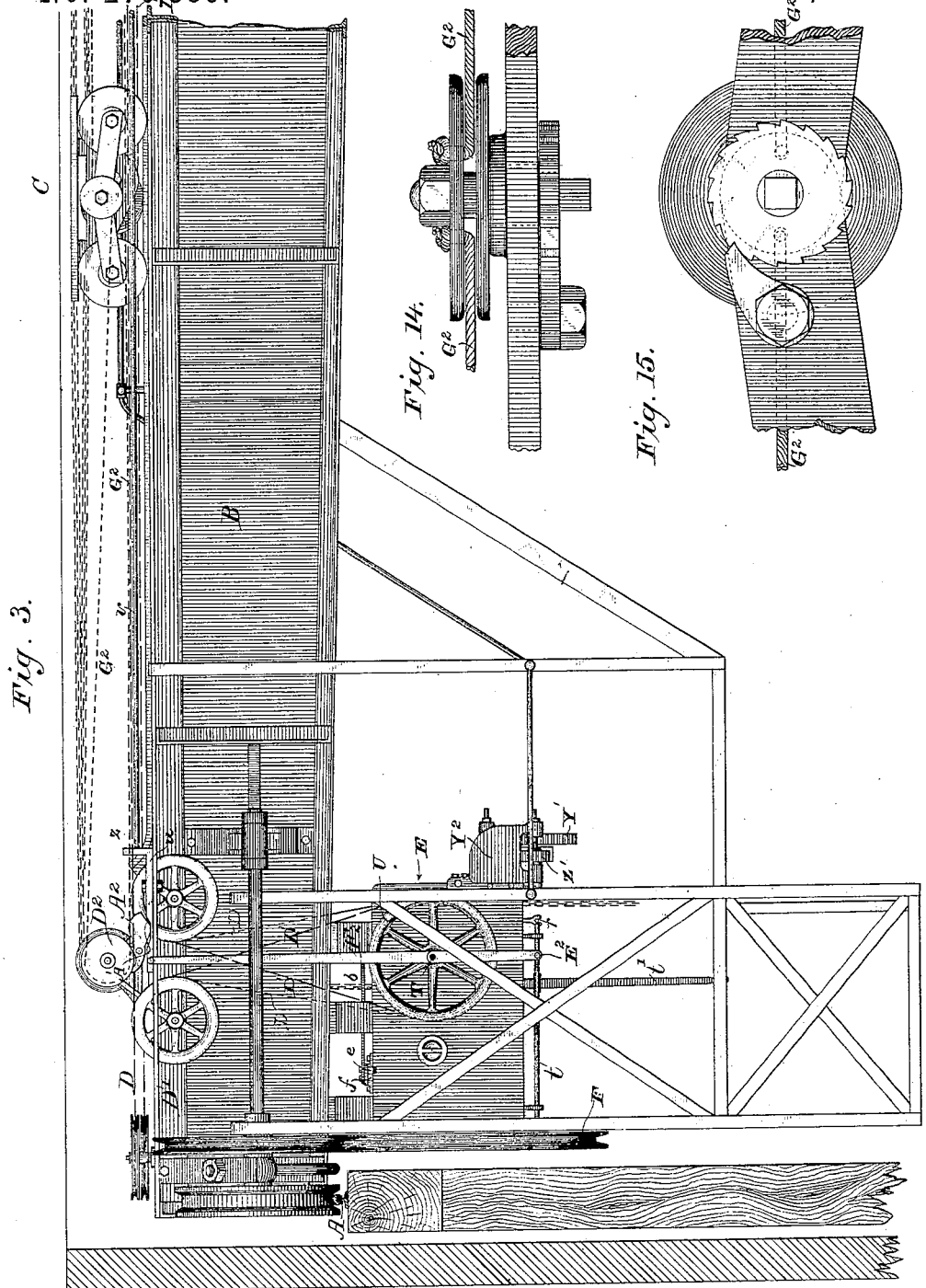
Figure 4:
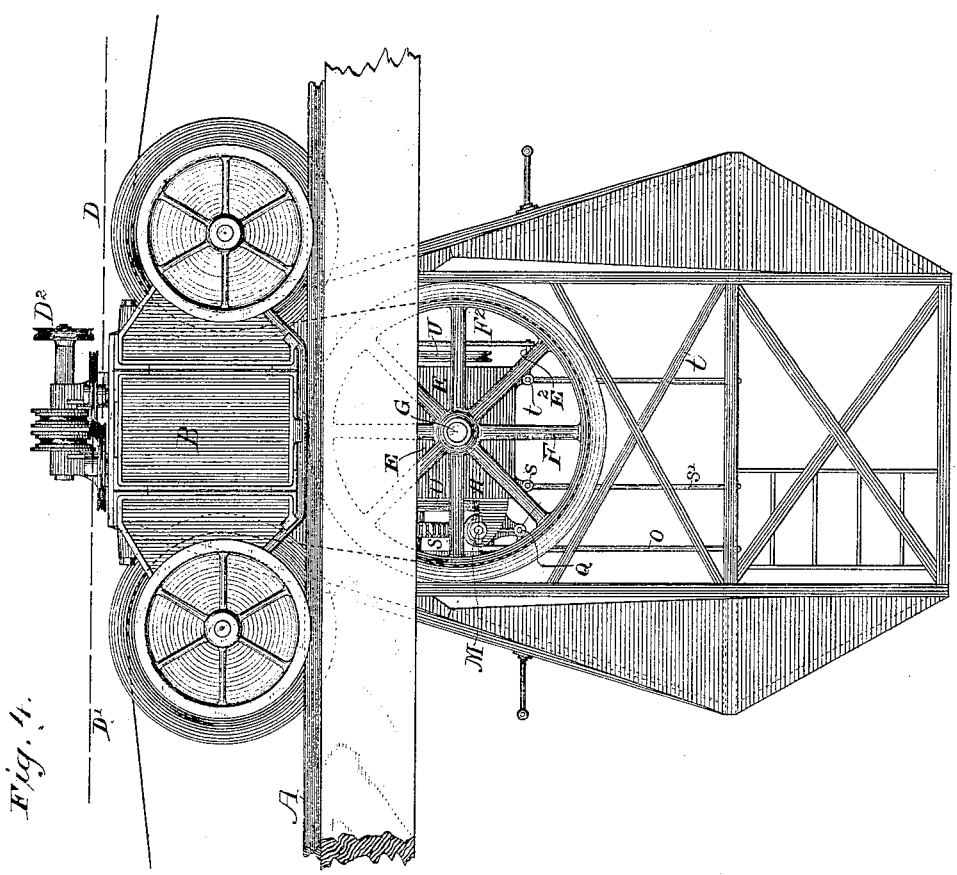
Figure 5:
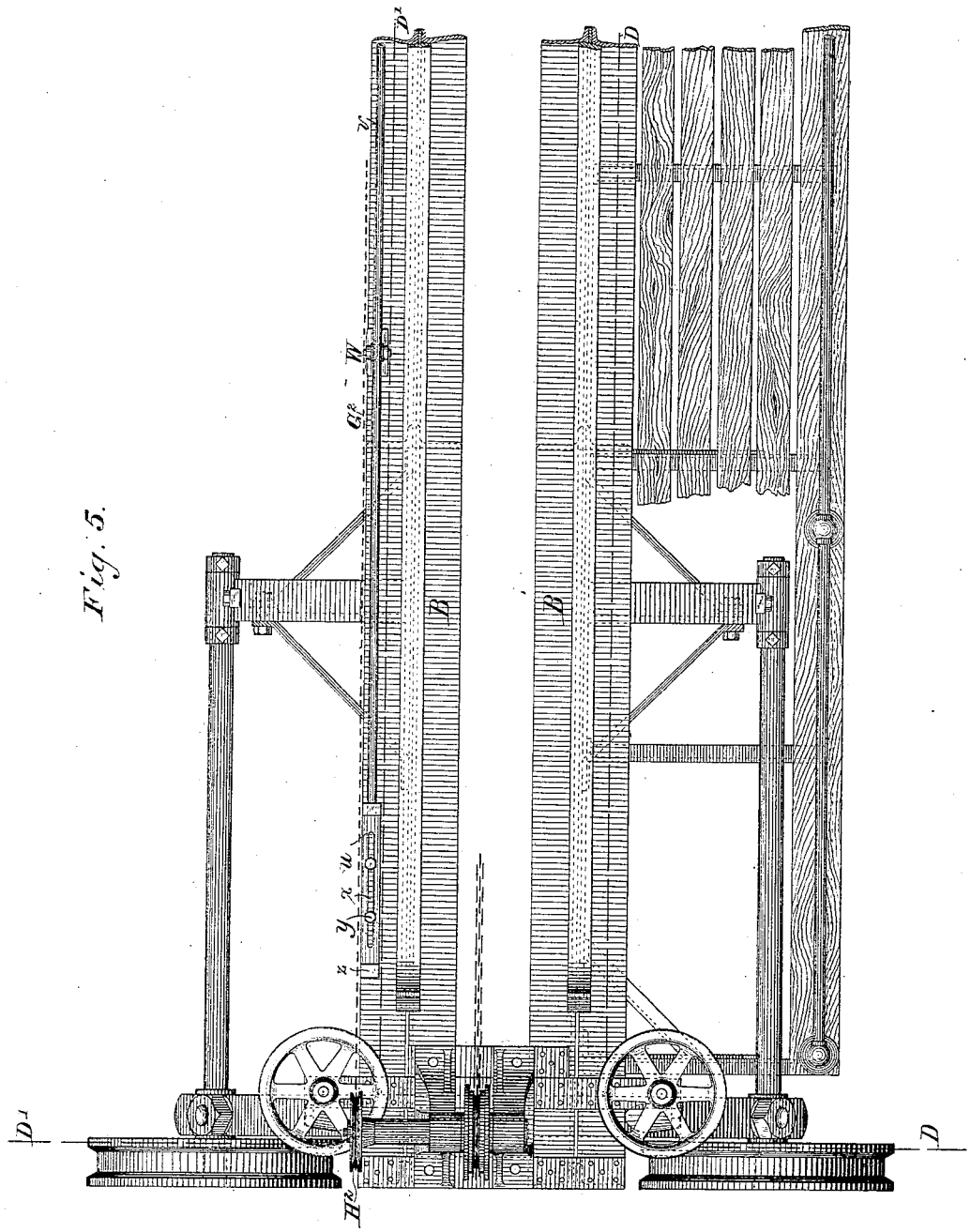
Figure 16:
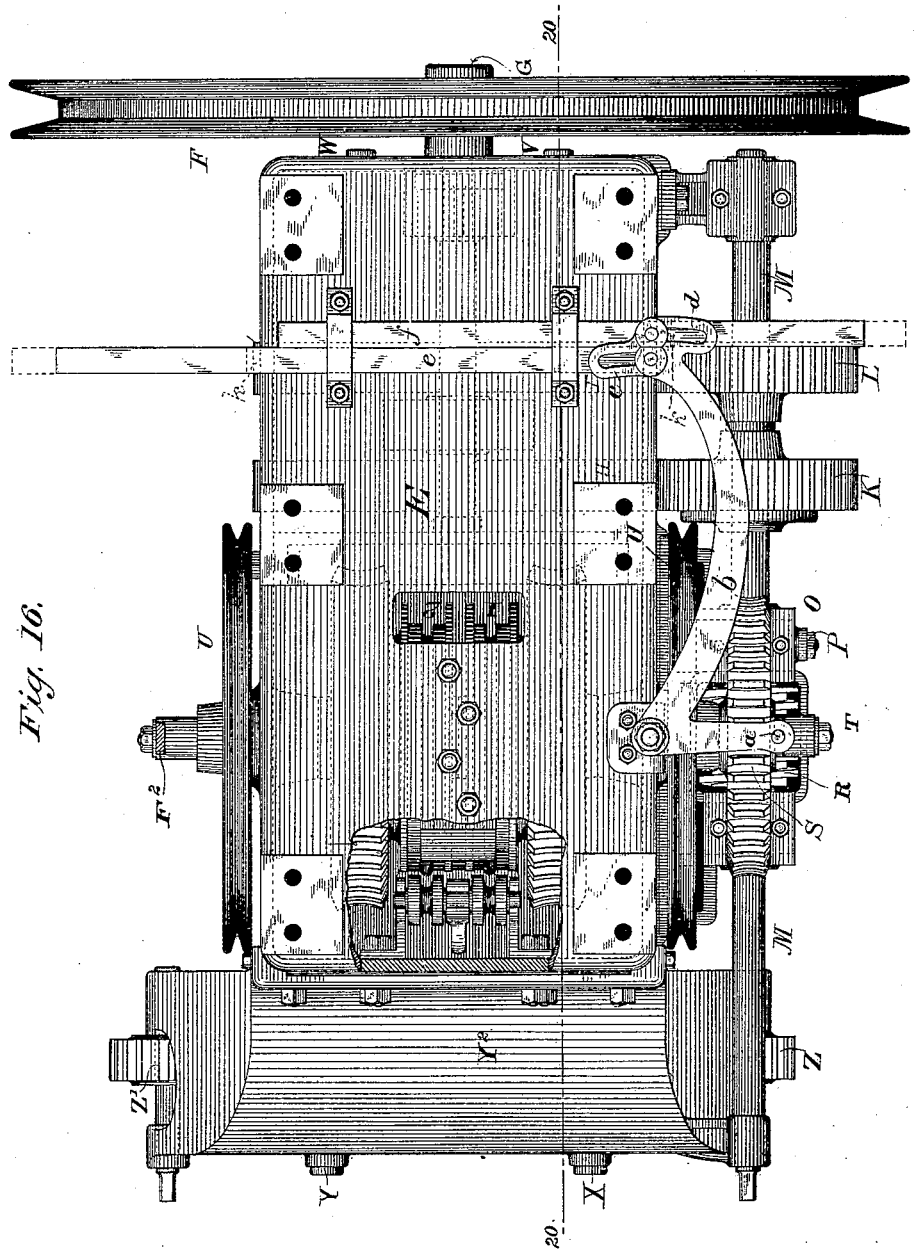
Figure 17:
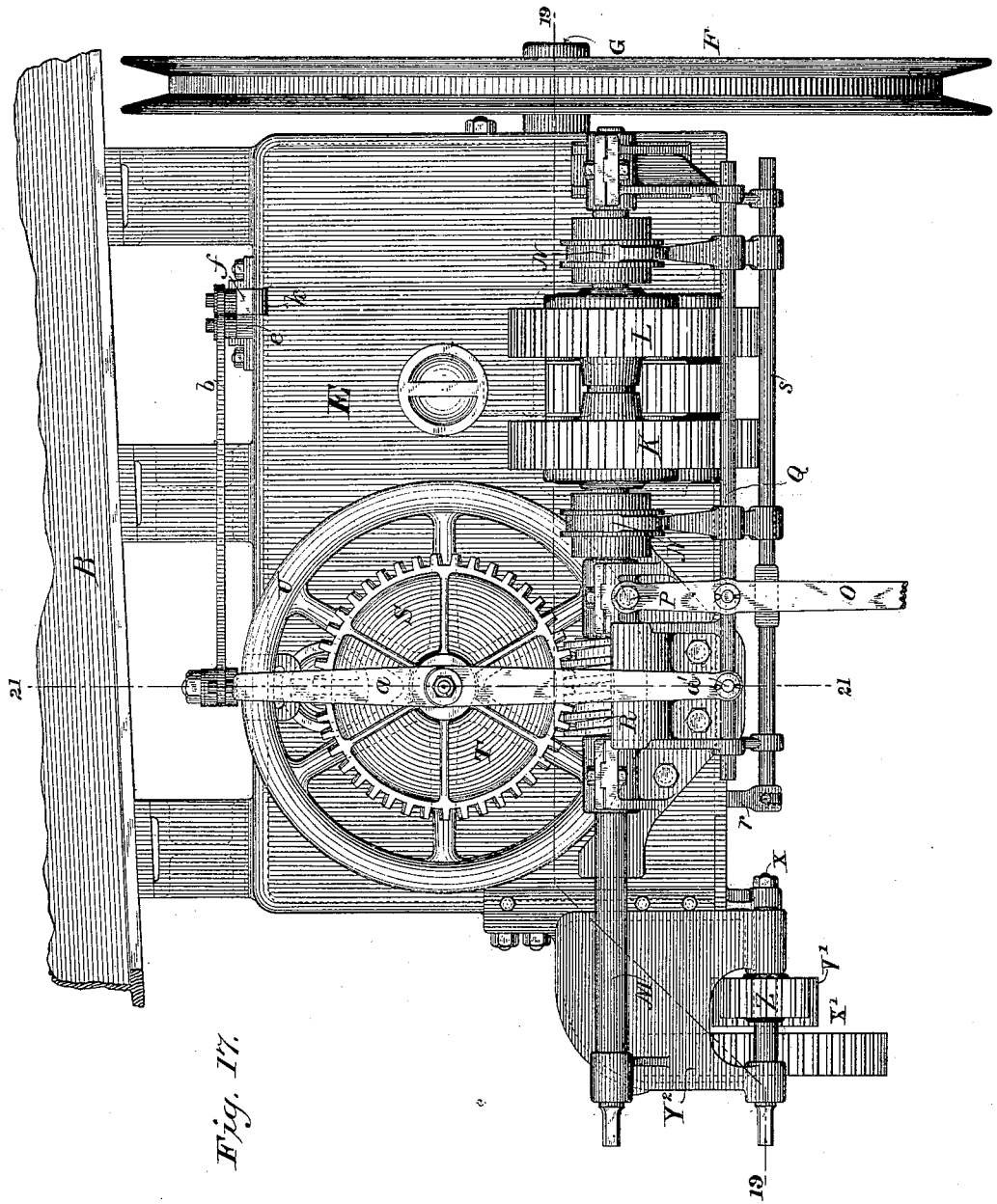
Figure 18:
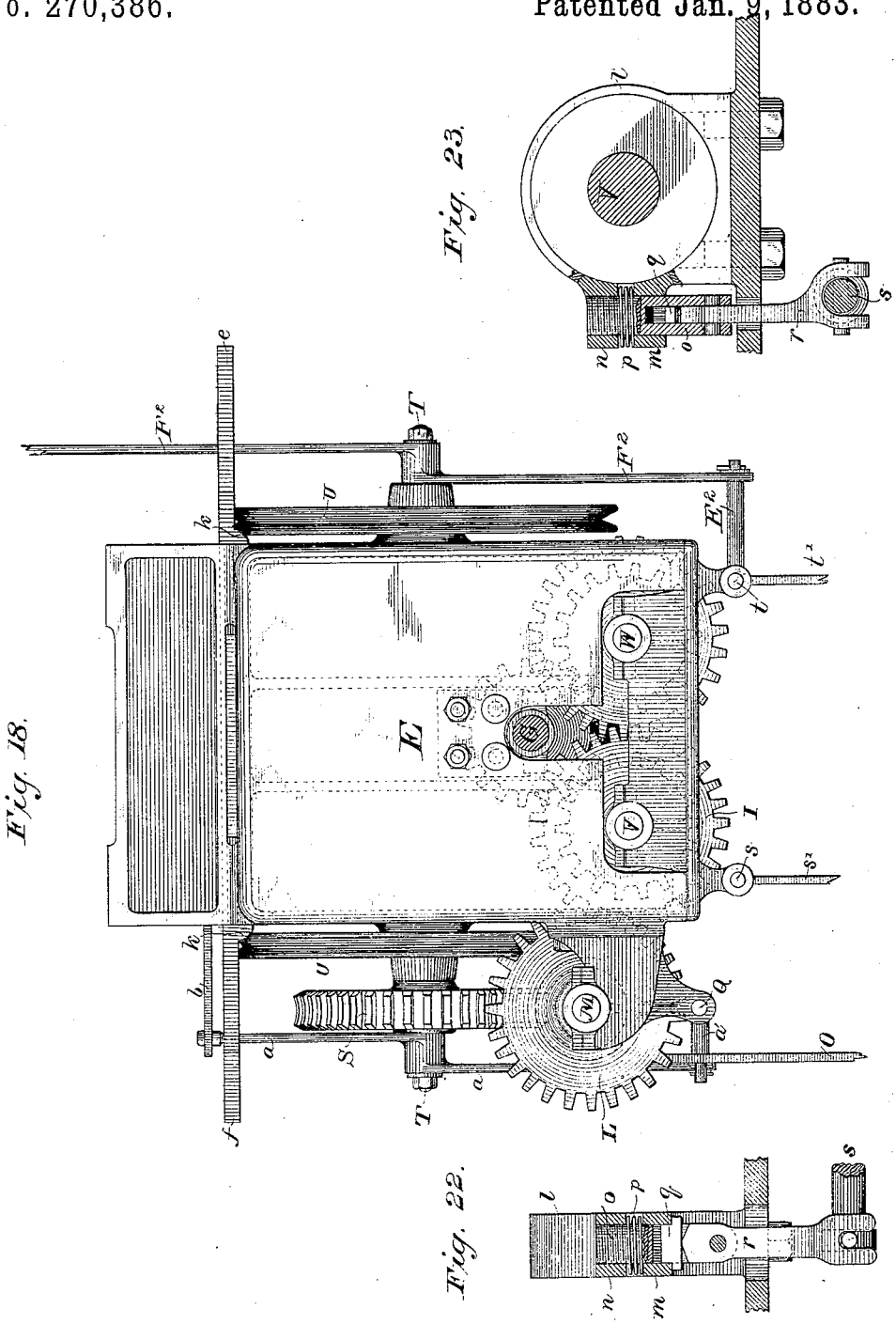
Figure 19:
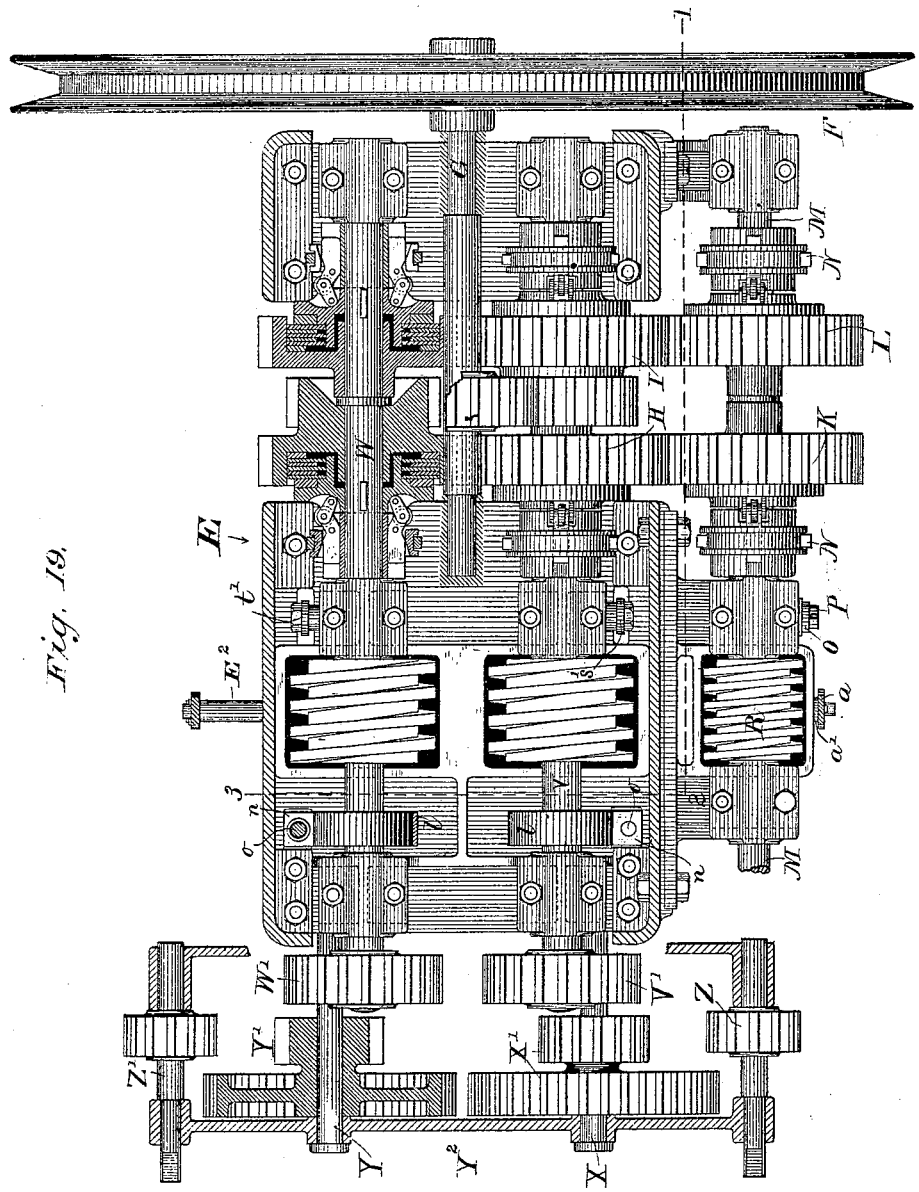
Figure 20:
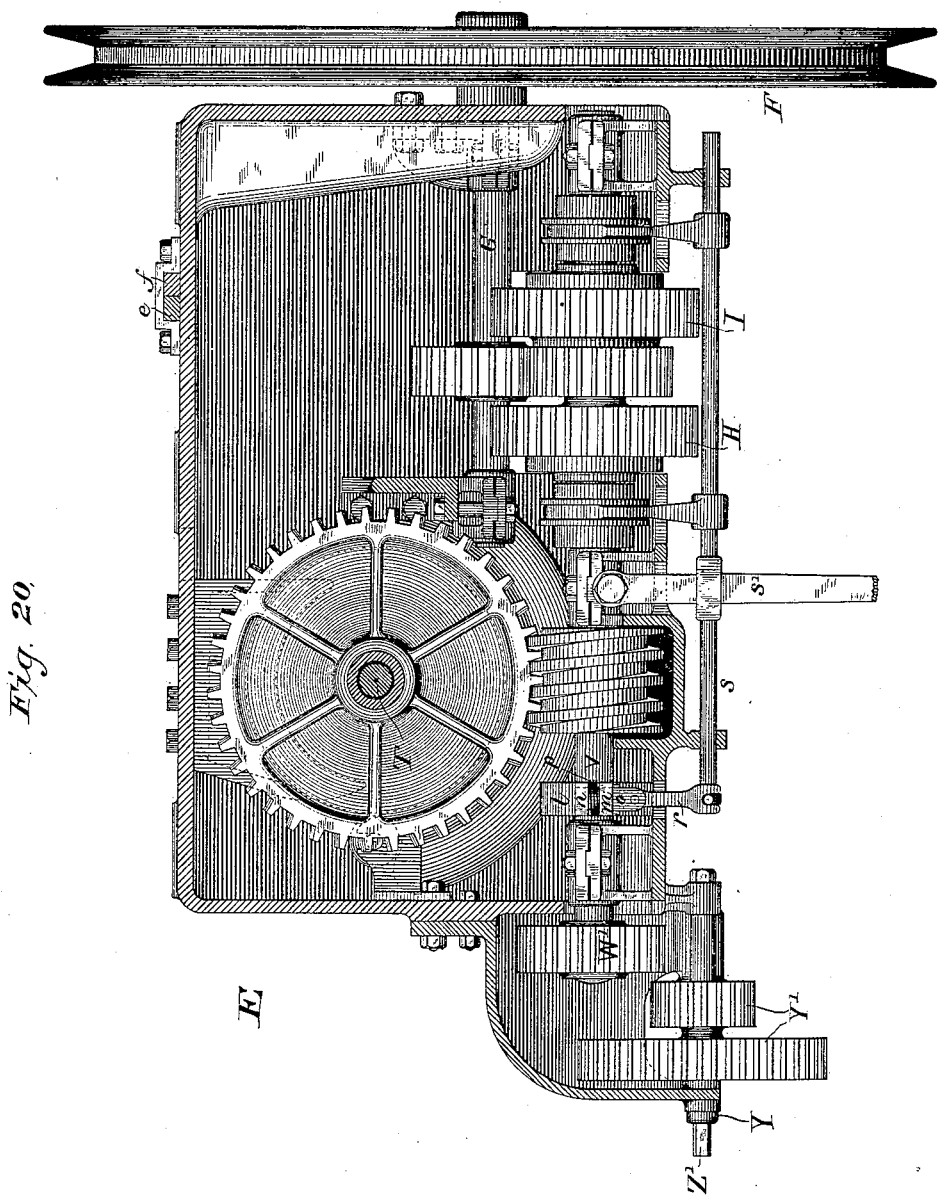
Figure 21:
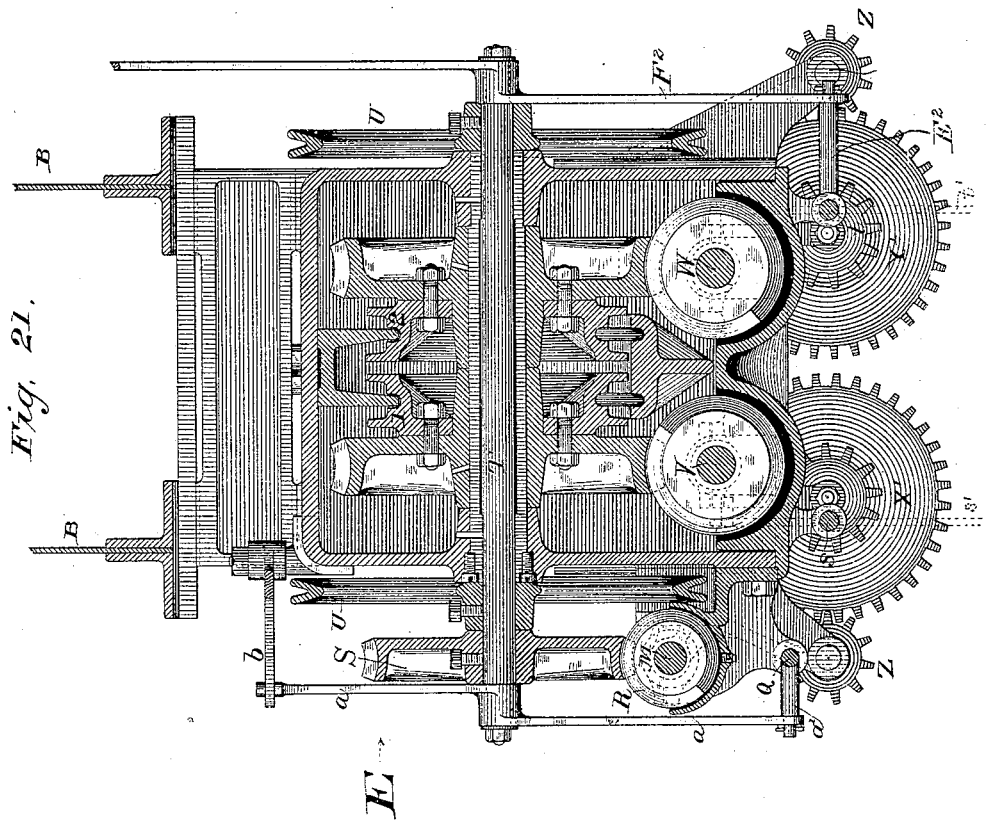

In the drawings, Figure 1 is a plan view of that end of a traveling crane to which the crab mechanism is attached, showing a suspended platform beneath. Fig. 2 is a side elevation of the same. Fig. 3 is a similar elevation of the opposite side of the same. Fig. 4 is an end elevation of the same. Fig. 5 is a plan view, on an enlarged scale, of the other end of the machine. Fig. 6 is a plan view, on the same scale, of the crab end of the mechanism. Figs. 7 and 8 are side elevations, on the same scale, of Figs. 5 and 6, respectively. Figs. 9 and 10 are detail sectional views of the brackets and journals for the bridge-wheel shafts which carry the bridge. Figs. 11, 12, and 13 are detail views, upon a large scale, of the trolley locking and controlling mechanism. Figs. 14 and 15 are detail views, upon a large scale, of the take-up drum carried by the trolley. Fig. 16 is a plan view of the crab mechanism with the bridge removed and the frame partly broken away to show the parts inside of the crab. Fig. 17 is a side elevation of the same. Fig. 18 is an end elevation of the same. Fig. 19 is a horizontal plan of the same on the line 19 19 of Fig. 17. Fig. 20 is a vertical sectional elevation of the same on line 20 20 of Fig. 16. Fig. 21 is a vertical transverse section of the same on the line 21 21 of Fig. 17. Figs. 22 and 23 are detail views of the automatic worm-shaft brake mechanism. Fig. 24 is a perspective diagrammatic or outline view of an entire traveling crane, indicating the method of running the power, traversing, and hoisting cables.

Referring to Fig. 24 and to the letters marked thereon, A indicates the parallel longitudinal main tracks; B, the bridge, supported and adapted to travel forward and back upon them; C, the trolley, adapted to travel to and fro upon the bridge at right angles to the tracks; E, the crab, and D D' the fixed cables, engaging by means of sheaves with the bridge and crab, substantially as set forth in the said Weston patent, except that the crab mechanism E does not travel with the trolley, but is suspended beneath one end of the bridge, and adapted to be driven by power to operate the bridge in connection with the fixed cables, to traverse the trolley, and to do the hoisting and lowering by means of chains and suitable shipping-levers under the control of the operator, all of which matter is well illustrated in detail in other figures of the drawings.

Still referring to Fig. 24, it will be observed that the fixed cables D D' are provided with suitable guide-sheaves above the crab, whereby the cables are deflected downward into engagement with their grip-wheels outside the crab-frame. Referring now to Fig. 19, there is illustrated within the bounds indicated by the dotted lines 1 2 3 the mechanism of my said Patent No. 237,675, the matters outside of these lines being additional.

Bearing in mind all the foregoing, it will now be easy to understand the following details of my improvements and to distinguish them from what is old.

F indicates a main driving-wheel, fixed upon the shaft G. In accordance with the specification of my said patent, motion is communicated from the shaft G to the gear-wheels H and I in opposite directions. These wheels gear with the loose wheels K and L upon the shaft M, and the result is the latter wheels also rotate in opposite directions. By any suitable clutch mechanism the wheels K and L may be caused to revolve the shaft M in either direction. Such a suitable clutch mechanism is illustrated at N as operated by means of the shipping-lever O, pivoted at P and connected with the shipper-rod Q, as shown in Figs. 18, 19, and 21. Upon the shaft M is a worm, R, which gears with and gives motion to the worm-wheel S, Fig. 18, which is rigidly secured to the shaft T, upon which are fixed the grip-sheaves U, over which the fixed cables D D' pass. As the grip-sheaves both revolve in the same direction, it is necessary to cross one of the fixed cables D', as illustrated in Figs. 2, 3, and 24. The result will be that, although the grip-wheels both turn in the same direction, the cables will be pulled from the two corners on the opposite side of the track, and the bridge will be traversed in either direction by simply revolving the grip-wheels in one direction or the other simultaneously. The advantage of thus crossing one of the fixed cables is that it saves a separate set of gearing to drive one of the grip-sheaves in a direction opposite to that of the other.

In order to prevent the bridge from traveling too far upon the tracks, from which accidents and damage might result, I provide certain automatic safety stop mechanism, which is best illustrated in Figs. 16, 17, 18, and 21, where $a$ indicates a lever connected at its lower end by an arm, $a'$, to the shipper-rod Q, pivoted at about its center on the end of the shaft T, and connected at its upper end to the short arm of a bell-crank lever, $b$. The long arm of this bell-crank lever is connected by means of two slots, $c$ and $d$, and suitable pins or studs working loosely in the slots with two thrust-rods, $e$ and $f$, working in suitable ways upon the frame of the crab. At the proper limit of travel for the bridge, near the opposite ends of one of the tracks, I provide spring buffers or stops $g$ and $h$, (see Fig. 1,) of any suitable construction, located in the path of the thrust-rods. The operation of this automatic stop mechanism is as follows: Supposing the clutches to be in the neutral position, as illustrated, Fig. 16, when it is desired to move the bridge the shipping-lever Q is moved by the operator to the right or left to engage one or other of the clutches N, which will result in moving the bridge in one direction or the other, as the case may be. The effect of the movement of the shipper-lever will be, through the instrumentality of the bell-crank lever $b$, to thrust forward one or the other of the thrust-rods $e$ and $f$ into the position indicated in the dotted lines, Fig. 16, and the movement of the bridge will always be in the direction toward which that rod points which is thrust forward. Now, when the bridge arrives near enough to the end of the tracks so that the thrust-rod which has been projected outward impinges against the spring-buffer or stop, the effect will be that the buffer will push back the advance thrust-rod and move the bell-crank lever and shipper-rod Q so that the clutch which had been engaged will be thrust into the neutral position again, and both clutches will then stand in that position, and the propelling-power for advancing the bridge will therefore be cut off. Then the spring-buffer will yield to the momentum of the advancing bridge (and of course tend somewhat to check it) until the bridge comes to rest. In most cases, however, a solid abutment or stop is equally good. The slots $c$ and $d$ enable each thrust-rod to be moved the proper distance without moving the other. In order to prevent the inward thrust of the spring-buffer upon the thrust-rods from extending too far, I provide a suitable stop upon each thrust-rod, as, for example, is shown in Figs. 16 and 17 at $k$.

In order to keep the load from running down, I provide an automatic-brake mechanism and apply it to each of the shafts V and W. (See Figs. 19, 20, 22, and 23.) This brake consists in each case of a strap, $l$, provided with a fixed lug, $m$, and a movable lug, $n$. A slotted bolt, $o$, is secured by a screw-thread or otherwise in the lug $n$, and extends down through an opening in the lug $m$, and is preferably provided with a spring, $p$, between the two lugs. Within the slot of the bolt $o$, I provide a block or follower, $q$, Fig. 22, with projecting shoulders, which extend beyond the bolt, so as to bear against the under side of the fixed lug $m$. Beneath this follower, within the slot, I provide a swinging bar or lever, $r$, having a V-shaped top bearing, which impinges against the under side of the follower. The result is that when the rod $r$ is in a perpendicular position the lug $n$ will be drawn down so as to clasp the brake-strap firmly around the shaft, and thus apply the brake. Whenever the rod $r$ is swung to one side or the other out of the perpendicular position the lug n will be raised by the spring and the brake will be released. In order to operate this brake, I joint the rod r at its lower end to an extension of the shipper-rod s, (or t,) which is operated by the hand-lever s', (or t',) and the result is that whenever the clutch mechanism connected with these rods and levers upon the shafts V and W is in the neutral position the brake will be applied, as clearly shown, for example, in Fig 20, and whenever the hand-levers, shipper-rods, and clutch mechanism are so operated as to engage one or other of the clutches for the purpose of moving the trolley, or of hoisting and lowering, the brake mechanism will be released.

In order to provide for the application of hand-power whenever that may be desirable—as, for example, for temporary use when the power may not be available on account of accident or otherwise—I extend the shafts V and W beyond the end of the crab-frame and provide each with a gear-wheel, V' W'. I then provide suitable supports and bearings projecting from the crab-frame, as well illustrated in Figs. 17, 19, and 20—to wit, the fixed shafts X and Y, which carry the loose double wheels X' and Y', and the gear-frame Y². I also provide the crank-shafts and pinions Z Z' and suitable bearings for the same in such relation to the gear-wheels V' W' that when the smaller of the double wheels is slid into gear with the gear-wheels V' W' the larger of the double wheels will be in gear with the pinions Z'. When the double wheels are in gear, cranks may be applied to the crank-shafts Z and hand-power applied which will operate all of the rotary mechanism illustrated in Fig. 19 as if operated by the main driving-shaft G. In other words, the crank-shafts may be operated independently or simultaneously and in either direction, at will. The provision of this supplemental hand-power apparatus in connection with the crab mechanism is attended with great convenience upon occasions. Provision may also be made for applying a crank directly to the end of the shaft M, so that when the power is disabled the bridge and trolley may thus both be moved by hand.

Heretofore it has been customary to locate the crab mechanism above the bridge, either on the trolley or in a fixed position at one end of the bridge. This situation of the crab I have discovered is attended with material disadvantages, which I have sought to overcome by suspending the crab in any suitable manner in a fixed position beneath one end of the bridge. The result of my improvement is that much greater overhead room is secured, thus increasing the height of hoist possible within a given building, and also rendering a suspended platform convenient and practicable, so that the operator can have a better view of the load and the operations of the crane. The hoisting and lowering and traversing of the trolley on the bridge are effected in this claim in the manner described in my Patent No. 242,271, May 31, 1881, with the necessary adaptation of that mechanism, so that it can be operated by power. This adaptation consists in the two chain-sheaves 1 and 2, Figs. 21 and 16, revolved by means of the worms and worm-wheels 5 and 3, 6 and 4, Figs. 21 and 19. These worms are actuated through suitable clutch mechanisms, 7. (Shown in Fig. 19 on the shafts V and W.) These clutch mechanisms are thrown in and out of engagement by means of levers s' and t', Figs. 3, 4, 18, and 21. Now, when one of the clutches is thrown into engagement one side of the chain will be pulled in or paid out, so that the load will either be hoisted or lowered. For the reasons hereinafter stated, hoisting or lowering by one side of the chain should be effected through the operation of the chain-wheel 1. If it is desired to hoist or lower by means of both wheels, and thus double the speed, this may be done by clutching both the shafts V and W simultaneously. This is effected by pushing both levers s' and t' in the same direction at the same time. If it is desired to have the load remain stationary and the trolley to travel across the bridge, one lever should be pushed in one direction and the other in the other, the effect of which will be that one side of the chain will be paid out as fast as the other is pulled in, so that the load will remain at a constant height and the trolley will be pulled in one direction or the other as desired. Supposing, now, that the load is to be hoisted by means of the chain-wheel 1—that is, one side of the chain pulled in—it is evident that the tendency of the first pull on one side of the chain will be to draw the trolley toward the crab, because the hoisting-chain turns an angle of ninety degrees over the trolley, and the first pull of the chain before any motion can be communicated to the load tends to bring the trolley directly toward the crab. Any considerable motion is prevented by the part of the chain which is not being pulled, because as soon as the strain on this part becomes equal to that on the part which is being pulled the trolley cannot move any farther. In many cases, however, it is absolutely essential that there should be no motion of the trolley whatever when the load is being raised, as in the case of setting copes and drawing patterns in foundry work, where any motion of the trolley would be apt to work great damage. To accomplish this result I therefore provide a separate brake mechanism, the normal condition of which is to hold the trolley absolutely stationary on the bridge, and which is only released when it is desired to cause the trolley to move, which release takes place by means of the motion of the lever t', which lever, as above explained, is used whenever it is desired to hoist or lower at double speed or to cause the trolley to travel on the bridge. The details of construction of this brake are as follows: I provide a rope or band, G², (see Figs. 3, 11, 13, 14, and 15,) extending around the lock-sheave D² on the crab end of the bridge and around the sheave H², Fig. 5, on the opposite end, the ends of the rope being connected to a winch upon the trolley, of ordinary construction, provided with a ratchet and pawl for keeping the rope taut. These parts are illustrated in detail in Figs. 14 and 15. Upon the crab end of the bridge I provide a weighted lever or detent, A², Fig. 11, pivoted to a suitable lug, B², and adapted to be operated normally by gravity to engage any one of the notches or recesses C² in the lock-sheave D².

In order to disengage the detent A², I provide a double cam, A', upon the adjacent sliding stop, adapted to slide under the weighted end of the detent and raise it, so that the catch upon the opposite end will be disengaged.

The shipper-rod t', Figs. 3 and 18, is provided with an arm, E², to which is connected the lower arm of the lever F², pivoted upon the shaft T and connected at its upper end with one of the sliding stops u. Now, assuming that the sliding stops are in what may be termed the "neutral" position, as illustrated in Figs. 5, 6, and 11, whenever it is desired to move the trolley in one direction or the other, the shipping-lever t' is pushed in one direction and the lever s' in the opposite direction. The effect of these motions will be as follows: The movement of the lever t', acting through the shipper-rod t and the arm E², actuates the lever F², which actuates the sliding stop u, said stop, by its cam A', raising the weighted end of the detent A² and releasing the lock-sheave D², so that the trolley is free to move. In addition to this function, the lever t' also actuates the clutch on the shaft W, causing the chain-wheel to turn in one direction or the other. The lever s', being pushed in the opposite direction from t', causes the shaft V to revolve in an opposite direction from W, and that part of the chain passing over the chain-wheel 1 has to move in the opposite direction from that passing over the chain-wheel 2. The total result, therefore, of pushing the two levers t' and s' in opposite directions will be that the brake will be thrown off and the trolley will begin to move at once.

From the above description it will be seen that so long as the lever t' is in the neutral position the brake will always be applied. It is therefore clear that for the ordinary hoisting or lowering by one chain the lever s' should be used, because the trolley will then be securely locked against motion and the load will rise exactly vertical. When, however, it is desired to hoist at double speed, both levers t' and s' are pushed in the same direction, which will of course, through the operation of the lever t', as before described, release the brake; but in this case no harm will result, for the reason that as both chains are being pulled from opposite directions the strain on the two sides of the trolley must be exactly equal, and there will therefore be no tendency of the trolley to move in either direction.

I also provide mechanism for automatically preventing the trolley from running too far on the bridge. To do this I connect the sliding stops u, Figs. 1, 2, and 3, upon the top of the bridge at either end by means of a pipe or rod, v, which may be supported at suitable intervals with small anti-friction rollers w, Fig. 7. The sliding stops are provided with guide-slots x and bolts y, Figs. 5 and 6, to secure them movably upon the bridge. Now, when the lever t' is moved to throw off the brake and engage its clutch both stops are moved—one of them invariably in the reverse direction from that in which the trolley is to move—that is, that stop moves to meet the trolley. Now, when the trolley reaches the end of the bridge toward which it is moving it impinges against the projection z of the sliding stop u. The result of this is twofold: first, the stop, through its connection with the lever t', throws off the clutch and brings the traversing mechanism to rest, while at the same time it allows the detent A² to engage with the lock-sheave D² and puts on the brake, so that it is impossible for the trolley to overrun at either end of the bridge.

Having thus described my invention, what I claim as new, and desire to secure by Letters Patent of the United States, is—

1. In combination with the driving-shaft G, the shafts V and W, gear-wheels H and I, the loose wheels K and L upon the shaft M, and suitable clutch mechanism, N, also upon that shaft, substantially as set forth.

2. In a crane, the combination of the fixed cables, the grip-wheels U U for engaging with said cables, and the driving-shaft M, provided with suitable driving and reversing mechanism, whereby the said grip-wheels may be rotated in either direction, substantially as described.

3. In a crane, the combination of two grip-wheels rigidly connected to a common shaft with two independent fixed cables, one of said cables being led into engagement with its grip-wheel in a direction contrary to that of the other, so that the rotation of the two wheels in one direction causes the two cables to be strained or pulled in contrary directions, substantially as described.

4. The combination of the shaft M, the worm R, the worm-wheel S, the shaft T, the grip-sheaves U, and the fixed cables D D', the latter being crossed, as specified, substantially as set forth.

5. In a traveling crane, the combination of a thrust-rod suitably connected to the clutch mechanism of the driving-shaft of the crane, and a stop or buffer, so that when the crane reaches the end of its longitudinal track the thrust-rod will strike against the stop or buffer and throw off the clutch, as and for the purposes described.

6. The combination of the hand-lever a, the shipper-rod Q for operating the clutch mechanism on the shaft M, the bell-crank lever b, the thrust-rods e and f, and the stop or buffer, substantially as set forth.

7. In a crane, a brake for preventing the running down of the load, suitably connected with the hand-lever by which the hoisting mechanism is set in motion, so that when the lever is moved to cause hoisting or lowering the brake is thereby thrown off, and when the lever is moved to bring the mechanism to rest the brake is thereby applied, substantially as described.

8. The combination of the rotary shaft V, (or W,) the brake-strap $l$, having the lugs $m$ and $n$, the slotted bolt $o$, the follower $q$, and the swinging lever $r$, substantially as set forth.

9. The combination, with the shipper-rods $s$, (or $t$,) of the hand-lever $s'$, (or $t'$,) with suitable clutch mechanism, N, and the brake mechanism upon the shaft V, (or W,) substantially as set forth.

10. In combination with the shafts V and W and their gear and clutch mechanism, the hand-power attachment consisting of the gear-wheels V' and W', the shafts X and Y, the double wheels X' and Y', and the crank-shafts and pinions Z Z', substantially as set forth.

11. The combination, with the main tracks, bridge and trolley of a traveling crane, of a crab suspended under one end of the bridge and containing mechanism adapted to traverse the bridge and trolley and hoist and lower the load, substantially as set forth.

12. In a traveling crane, the combination of the bridge and the crab containing the operating mechanism and suspended beneath the bridge, with the fixed cables D D' and suitable guide-sheaves above the crab, whereby the said fixed cables are deflected downward into engagement with their grip-wheels, substantially as described.

13. In a traveling crane, the combination of the bridge and the crab containing the operating mechanism and suspended beneath the bridge, with the hoisting-chains and suitable guide-sheaves above the crab, whereby the said chains are deflected downward into engagement with their driving wheels or barrels, substantially as described.

14. In a crane, the combination of a trolley, a hoisting-chain, a locking device, and a lever for actuating the clutches which impart motion to the chain wheel or barrel, so that when the clutches are disengaged the trolley is fixed by the locking device, and when the lever is moved in either direction to actuate the clutches the locking device is disengaged and the trolley left free to move, substantially as described.

15. In a crane, a brake for holding the trolley stationary on the bridge, suitably connected with the hand-lever by which the trolley-traversing mechanism is set in motion, so that when the lever is moved to cause the trolley to travel the brake is thereby thrown off, and when the lever is moved to stop the trolley the brake is thereby applied.

16. In a crane, the combination of a trolley and a sliding stop suitably connected with the trolley-traversing mechanism, so that when the trolley impinges against the stop the clutch which actuates the trolley-traversing mechanism is thrown off and the mechanism brought to rest, substantially as described.

17. In a crane, the combination of a trolley, a sliding stop, and a trolley-brake, so constructed that when the trolley impinges on the stop the brake is automatically applied to hold the trolley stationary, substantially as described.

18. In combination with the shipper-rod $t$ and its clutch mechanism N, the lever $F^2$ and the sliding stops $u$ on top of the bridge, in the path of the trolley, and connected together, substantially as set forth.

19. In combination with the trolley, the lock-sheave $D^2$, the sheave $H^2$, the band $G^2$, the detent $A^2$, and the double cam $A'$, substantially as set forth.

20. The combination of the shipper-rod $t$ and its clutch mechanism, the lever $F^2$, the connected sliding stops $u$, the trolley, the lock-sheave $D^2$, the sheave $H^2$, the band $G^2$, the detent $A^2$, and the double cam $A'$, substantially as set forth.

In testimony whereof I have hereunto subscribed my name this 26th day of October, A. D. 1882.

THOS. W. CAPEN.

Witnesses:
GEO. E. WHITE,
SCHUYLER MERRITT.